Patented Sept. 15, 1953

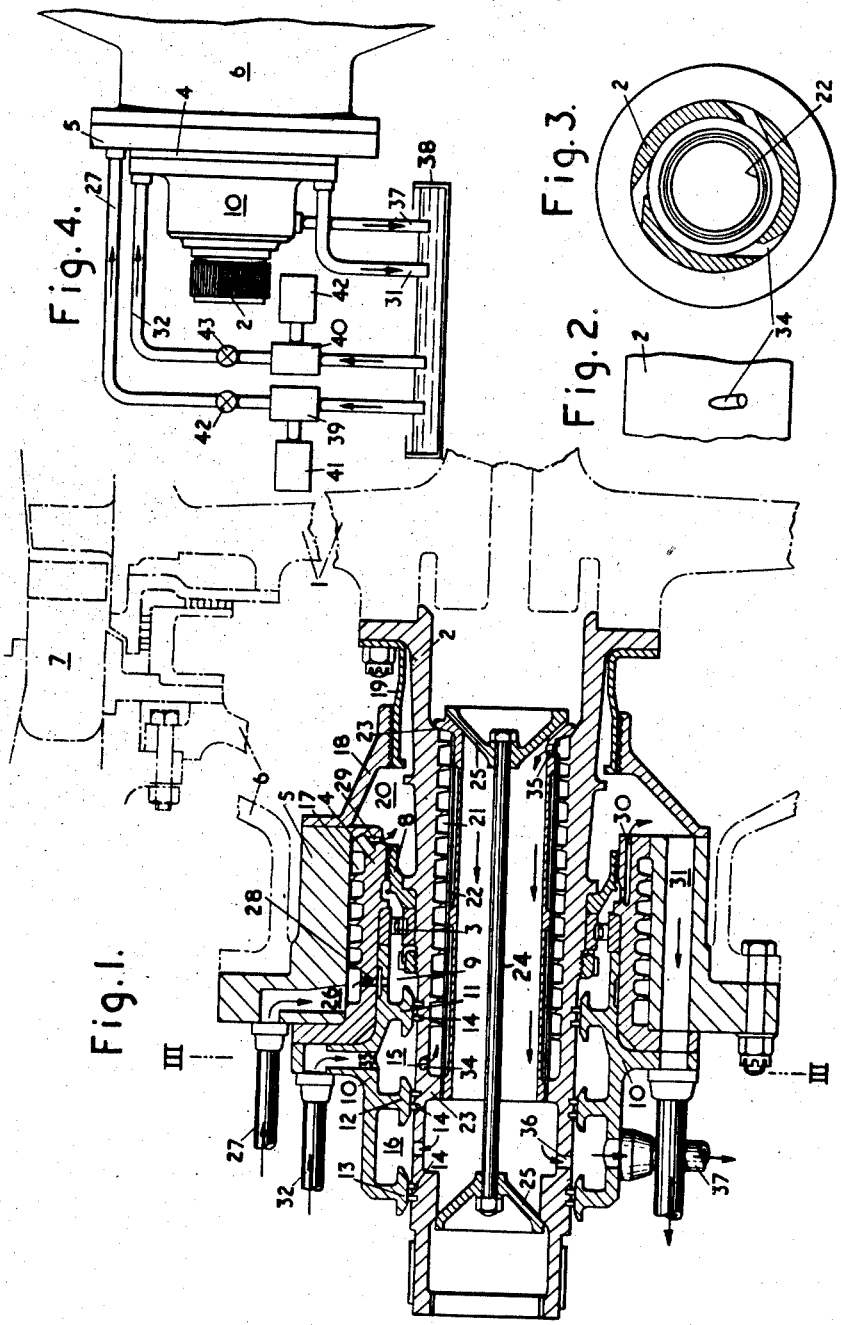

2,652,294

UNITED STATES PATENT OFFICE 2,652,294

TURBINE BEARING COOLING MEANS

Leonard Islip, Kincote, near Rugby, and Sydney William Henry Perry, Knighton, England, assignors to Power Jets (Research and Development) Limited, London, England, a British company Application November 26, 1948, Serial No. 61,993
In Great Britain December 13, 1947

1 Claim. (Cl. 308—77)

This invention relates to bearing arrangements of turbines and like fluid flow machines, and especially gas turbines, which are required to operate at high temperatures. In such machines, unless the rotor and the fixed structure supporting it are cooled, the bearings, and more particularly that at the inlet side of the rotor, will become heated by conduction through the material of the rotor and stator structure until eventually the bearing temperature will become comparable to that of the working fluid stream. In these circumstances it is clearly necessary to provide means for cooling the bearings; moreover, in the case of a turbine whose rotor runs at an unusually high temperature and has considerable mass and accordingly absorbs a large amount of heat and also takes a long period to stop when shutting down, it is necessary that the cooling should remain effective after the rotor ceases to be driven by the working fluid. It is an object of the present invention to provide a cooled bearing arrangement in a turbine having such characteristics which will have the general attribute of remaining effective during shutting down of the turbine. A further object is the provision of a particular form of bearing arrangement suitable for use in a turbine or like fluid flow machine, and in particular a turbine having the characteristics mentioned, which will be highly effective for the primary purpose of keeping the bearing cool.

The invention accordingly proposes, in a gas turbine a turbine rotor bearing arrangement in which provision is made for the flow of a coolant fluid through or around parts thereof and means for maintaining said flow independently of the running of the bearing. Thus the supply of fluid to the bearing is derived from a source which maintains the pressure of such supply independently of the operation of the rotor with which the bearing is associated, thereby enabling the flow of coolant to be maintained when the rotor ceases to be driven and avoiding damage to the bearing by reason of a temperature rise due to the large amount of residual heat in the rotor after normal running ceases.

The invention further proposes for a turbine or like fluid flow machine operating at a high temperature, a bearing arrangement in which a journal element embraced by the bearing, and structure surrounding the journal element and embracing the bearing, are provided with chambers for the passage of coolant fluid extending axially beyond, or at least as far as, the axial extent of the bearing and circumferentially so as substantially completely to enclose the relatively moving parts of the bearing. Thus respective chambers or groups of chambers may be disposed radially inwardly and outwardly, and preferably at the sides of the relatively moving parts of the bearing, the fluid passing through them affording insulation against the transfer of heat from the journal element and the surrounding structure to the bearing and limiting such transfer of heat largely to that which is conducted through the wall of the journal element after cooling.

In a constructional form of the invention a bearing arrangement is contemplated, for a rotor attached to a journal element, in which a bearing race is disposed in a bearing housing which affords, firstly, a bearing chamber enclosing the journal element of the bearing at either side of the race, secondly, further chambers arranged respectively between the bearing chamber and the rotor and on the side of the bearing chamber remote from the rotor and which also enclose the journal element so that the latter is enclosed by these chambers over the greater part of its axial length, and, thirdly, a radially outer chamber which encloses the bearing race in order to restrict the inward transmission of heat thereto. The journal element itself may be hollow and is preferably provided internally with structure defining an annular chamber adjacent to its inner wall. Suitable connections and transfer ports are provided to enable a flow of liquid coolant to take place through each of these spaces and thence to a drain or back to the source of supply, these connections preferably being such that the supply of coolant to the inside of the journal is independent of that to the bearing chamber and the chamber enclosing it. Thus, there may be one supply connected to the chamber enclosing the bearing race, which chamber in turn has transfer ports leading to the bearing chamber and the chamber between the bearing chamber and the rotor, whilst a further supply may be connected to the chamber on that side of the bearing chamber remote from the rotor, the former of which chambers may be divided into axially successive compartments, of which one is provided with a transfer port to lead fluid into the annular chamber formed inside the journal element and the other with a transfer port receiving fluid discharged from the journal.

The supply of coolant is taken from a source capable of maintaining the supply pressure independently of the operation of the rotor (for example, from a pump or pumps driven by an independent motor or motors, or from a part of the plant which continues to run when the rotor is stationary) and control means are preferably also provided to enable the supply to be independently adjusted in accordance with the respective requirements of the bearing cooling and the journal cooling.

According to a further feature of the invention the chamber enclosing the bearing and/or the annulus formed within the journal element is divided by ribs or the like to afford circumferentially running, axially adjacent channels through which successively coolant fluid is constrained to flow in passing through the chamber. Thus the chamber may be partitioned to form helical channels.

Other features of the invention will become apparent from a consideration of particular constructional example now to be described by the aid of the accompanying drawings, in which Figure 1 is a cross sectional elevation of part of a turbine rotor and nozzle structure associated with a bearing in accordance with the invention, Figure 2 is a scrap view illustrating a part of the journal member of the bearing, Figure 3 is a section on line III—III of Figure 1, and Figure 4 represents a schematic arrangement of plant components for supplying coolant to the bearing.

Referring to the drawings, 1 represents the high pressure end of a large multistage gas turbine rotor having a journal member attached to it in the form of a hollow stub shaft 2. The latter is supported by a roller bearing race 3 mounted in a stationary bearing sleeve 4 which in turn is carried in a main bearing housing 5 attached to a diaphragm 6 peripherally supporting the stationary nozzle structure 7 of the turbine. The bearing sleeve 4 is radially spaced from the journal member and a sealing ring 8 on the latter co-operates with the bearing sleeve to define one end of a space 9 containing the bearing race. A further housing sleeve 10 is spiggotted into the sleeve 4 and is provided with three radially inwardly extending flanges 11, 12 and 13 which engage corresponding pairs of sealing rings 14 inset into the journal member. The journal housing sleeve 10 thus defines the remaining end of the bearing chamber 9 and also defines two further chambers 15, 16 enclosing the journal member.

The housing sleeve 4 has external fins defining a helical channel 17 thereon and is enclosed by the main housing member 5. The latter is provided with a shroud extension 18 towards the rotor which co-operates with a sealing sleeve 19 on the rotor to define a further annular space 20 enclosing the journal member between the bearing space and the rotor.

The main bearing housing 5 is formed in its upper part with an inlet passage 26 coupled to an oil supply pipe 27 supplying oil from a suitable source to the helical passage 17. This passage communicates through a transfer port 28 with the upper part of the bearing chamber 9 and through a transfer port 29 with the upper part of the chamber 20. The bearing chamber 9 discharges into the lower part of the chamber 20 by way of a transfer port 30 and the chamber 20 has an outlet 31 to a drain back to the source of supply. The journal sleeve 10 has connected to it a further supply pipe 32 which supplies oil by way of a passage 33 to the upper part of the space 15, the part of the journal member wall enclosed by this chamber having therein transfer ports 34 communicating with the helical channel 21, these ports 34 being tangentially disposed as indicated in Figure 2 in order to introduce oil to the helical passage with a degree of whirl matching the angle of the helix. The outlet from the helical passage inside the stub shaft is by way of a transfer port 35 to the chamber defined by the closure elements 25 and sleeve 22 and from this space the coolant is discharged by transfer ports 36 to the chamber 16 and thence through an outlet 37 to a drain back to the source of supply. The supply of oil (see Figure 4) is drawn from a sump 38 by pumps 39 and 40 driven by independent motors, 40 and 41 respectively, and is delivered to the bearing through the supply pipes 27 and 32 respectively, being controlled by independent valves 42 and 43 respectively, and is returned to the sump from the outlets 31 and 37 respectively.

It will be appreciated that with the arrangement described in the foregoing, in addition to adjustment of the supply being possible to conform to the requirements of different parts of the bearing arrangement independently, the bearing race itself is also automatically lubricated whilst the journal element is to all intents and purposes completely enclosed over the greater part of its length by a body of coolant and the bearing race is further insulated by the enclosing oil chamber 17, so that only a negligible heat path remains for the transmission of heat from the diaphragm 6. Similarly the only heat path into the parts thus enclosed is by conduction through the wall of the journal member from the rotor.

We claim:

A gas turbine or like fluid flow machine comprising a rotor and stationary structure which are subjected in operation to high temperatures, a hollow journal element integral with said rotor, a bearing embracing said journal element externally and itself embraced by said stationary structure, a sleeve positioned within said journal element which defines an annular chamber and a central chamber within said journal element for the passage of coolant fluid therethrough, said sleeve being apertured to afford connecting passages between said annular and central chambers, said stationary structure being hollowed and defining with said journal element a chamber for the passage of fluid coolant without said journal element, each of said chambers extending circumferentially of said journal element at a region thereof lying between said rotor and bearing, and said stationary structure being further hollowed to afford a chamber for the passage of coolant fluid extending circumferentially about and axially at least as far as the axial extent of said bearing and two additional chambers extending circumferentially around said journal element on the side of said bearing remote from said rotor, said journal element being apertured to afford connecting inlet passages between one of said additional chambers and one of said chambers within said journal element and to afford connecting outlet passages between the other of said additional chambers and the other of said chambers within said journal element.

LEONARD ISLIP.
SYDNEY WILLIAM HENRY PERRY.

References Cited in the file of this patent

UNITED STATES PATENTS

| Number | Name | Date |
|---|---|---|
| 434,995 | Robertson | Aug. 26, 1890 |
| 722,875 | Naef | Mar. 17, 1903 |
| 1,404,538 | Mitchell | Jan. 24, 1922 |
| 1,530,982 | Coppus | Mar. 24, 1925 |
| 2,184,197 | Schutte | Dec. 19, 1939 |
| 2,386,639 | Stafford | Oct. 9, 1945 |
| 2,423,973 | Halford | July 15, 1947 |
| 2,493,160 | Morley | Jan. 3, 1950 |
| 2,573,597 | Paden | Oct. 30, 1951 |